(12) United States Patent
Xie et al.

(10) Patent No.: US 12,507,130 B2
(45) Date of Patent: *Dec. 23, 2025

(54) HANDOVER METHOD, DEVICE AND SYSTEM IN MULTI-CONNECTION NETWORK

(71) Applicant: CHINA TELECOM CORPORATION LIMITED, Beijing (CN)

(72) Inventors: Weiliang Xie, Beijing (CN); Xin Zhang, Beijing (CN); Jiangang Chen, Beijing (CN); Peng Li, Beijing (CN); Na Lu, Beijing (CN); Zhijun Li, Beijing (CN)

(73) Assignee: CHINA TELECOM CORPORATION LIMITED, Beijing (CN)

( * ) Notice: Subject to any disclaimer, the term of this patent is extended or adjusted under 35 U.S.C. 154(b) by 547 days.

This patent is subject to a terminal disclaimer.

(21) Appl. No.: 17/925,911

(22) PCT Filed: May 7, 2021

(86) PCT No.: PCT/CN2021/091987
§ 371 (c)(1),
(2) Date: Nov. 17, 2022

(87) PCT Pub. No.: WO2021/238602
PCT Pub. Date: Dec. 2, 2021

(65) Prior Publication Data
US 2023/0180066 A1 Jun. 8, 2023

(30) Foreign Application Priority Data
May 29, 2020 (CN) .......................... 202010472373.4

(51) Int. Cl.
*H04W 36/00* (2009.01)
*H04W 84/04* (2009.01)

(52) U.S. Cl.
CPC ...... *H04W 36/0027* (2013.01); *H04W 84/042* (2013.01)

(58) Field of Classification Search
CPC . H04W 36/0027; H04W 84/042; H04W 8/18; H04W 36/22; H04W 28/0215; H04W 88/06; H04W 36/08; H04L 45/851
See application file for complete search history.

(56) References Cited

U.S. PATENT DOCUMENTS

| 5,315,636 A | * | 5/1994 | Patel ...................... H04M 3/54 |
| | | | 455/445 |
| 2013/0155849 A1 | | 6/2013 | Koodli et al. |

(Continued)

FOREIGN PATENT DOCUMENTS

| CN | 103338483 | 10/2013 |
| CN | 103582011 A | 2/2014 |

(Continued)

OTHER PUBLICATIONS

Notification to Grant Patent Right for Invention dated Jan. 17, 2024 in related CN Application No. 202010472373.4 and it's English Translation, 7 pages.

(Continued)

*Primary Examiner* — Charles C Jiang
*Assistant Examiner* — Rachel Elizabeth Marks
(74) *Attorney, Agent, or Firm* — Andrew M. Calderon; Calderon Safran & Wright P.C.

(57) ABSTRACT

The present disclosure relates to a handover method, a network device and a system in a multi-connectivity network. The method includes: determining a type of a user of a terminal during a handover procedure of the terminal to a multi-connectivity network of the construction operator; determining a user plane split policy corresponding to the terminal according to the type of the user of the terminal;

(Continued)

and switching a user plane channel of the terminal to a user plane channel of a first standard network of the construction operator, in a case that the user plane split policy is split-disabled, and switching the user plane channel of the terminal to the user plane channel of the first standard network and a user plane channel of a second standard network of the construction operator, in a case that the user plane split policy is split-enabled.

20 Claims, 6 Drawing Sheets

(56) References Cited

U.S. PATENT DOCUMENTS

| | | | | |
|---|---|---|---|---|
| 2013/0189978 | A1* | 7/2013 | Lee | H04W 48/02 455/434 |
| 2015/0139184 | A1 | 5/2015 | Wang et al. | |
| 2015/0289270 | A1 | 10/2015 | Knapp et al. | |
| 2016/0057687 | A1* | 2/2016 | Horn | H04W 76/10 370/331 |
| 2016/0278139 | A1 | 9/2016 | Lei et al. | |
| 2020/0053616 | A1 | 2/2020 | Zhu et al. | |
| 2020/0389823 | A1 | 12/2020 | Xu et al. | |
| 2022/0174760 | A1* | 6/2022 | Xu | H04W 76/30 |
| 2023/0189311 | A1* | 6/2023 | Xie | H04L 47/808 370/329 |

FOREIGN PATENT DOCUMENTS

| | | | |
|---|---|---|---|
| CN | 104025645 A | 9/2014 | |
| CN | 104144511 A | 11/2014 | |
| CN | 104581832 | 4/2015 | |
| CN | 105472659 A | 4/2016 | |
| CN | 105493555 A | 4/2016 | |
| CN | 105519167 A | 4/2016 | |
| CN | 106134139 A | 11/2016 | |
| CN | 107734511 | 2/2018 | |
| CN | 108207010 A | 6/2018 | |
| CN | 108617020 A | 10/2018 | |
| CN | 108617028 A | 10/2018 | |
| CN | 109743783 | 5/2019 | |
| CN | 110225553 A | 9/2019 | |
| CN | 110536477 A | 12/2019 | |
| CN | 110890967 A | 3/2020 | |
| CN | 110932986 | 3/2020 | |
| CN | 110972204 A | 4/2020 | |
| CN | 111083688 A | 4/2020 | |
| CN | 111182609 A | 5/2020 | |
| CN | 111885656 A | 11/2020 | |
| EP | 3 007 516 A1 | 4/2016 | |
| EP | 3 562 193 A1 | 10/2019 | |
| WO | 2014/181181 A1 | 11/2014 | |
| WO | 2018/09360 A1 | 5/2018 | |
| WO | 2018/145376 | 8/2018 | |
| WO | 2018/182240 A1 | 10/2018 | |
| WO | WO-2018205094 A1 * | 11/2018 | H04W 76/16 |
| WO | 2019193237 | 10/2019 | |
| WO | 2020/060852 A1 | 3/2020 | |

OTHER PUBLICATIONS

He Lin et al., "Comparative study on 5G network sharing technology scheme". 5G Co-construction and Sharing Technology, Application of Electronic Technique, 2020, 46(5): 14-17, Abstract, 4 pages.

Li Xiao et al., "Research on 5G co-construction and shared voice service solution", Application of Electronic Technique, 2020, 46(4); 6-9, Abstract, 4 pages.

Zhang Zhirong et al., "Research on 5G network co-construction and sharing technology", Application of Electronic Technique, 2020, 46(4): 1-5, Abstract, 5 pages.

Anonymous, "3rd Generation Partnership Project; Technical Specification Group Services and System Aspects'Network Sharing; Architecture and functional description (Release 15)", 3GPP TS 23.251 V15.1.0 Sep. 2018, 17 Pages.

Japanese Office Action dated May 15, 2024 in JP Application No. 2022-573466 with English Translation, 9 pages.

Extended European Search Report issued in related EP Application No. 21812099.6 on Sep. 14, 2023; 10 pages.

Qualcomm Incorporated: "(TP for NR BL CR for TS 38.413) Mobility restrictions: 5GC restriction in NGAP", 3GPP Draft; R3-183733_5GCN Restrictionngap, 3RD Generation Partnership Project (3GPP), Mobile Competence Centre; 650, Route Des Lucioles; F-06921 Sophia-Antipolis Cedex; France—vol. RAN WG3, No. Montreal, Canada; Jul. 1, 2018—3 pages.

Interdigital Communications: "Summary of offline discussions on network sharing", 3GPP Draft; R3-190947 Offline Summary Ran Sharing.V6, 3RD Generation Partnership Project (3GPP), Mobile Competence Centre; 650, Route Des Lucioles; F-06921 Sophia-Antipolis Cedex; France—vol. RAN WG3, No. Athens, Greece; Mar. 4, 2019—3 pages.

First Office Action for Chinese Application No. 202010477384.1 dated Mar. 30, 2022, with English Translation, 31 pages.

Second Office Action for Chinese Application No. 202010477384.1 dated Sep. 7, 2022, with English Translation, 16 pages.

PCT/CN2021/091982 PCT ISR Dated Jul. 27, 2021 in Chinese, 4 pages.

PCT/CN2021/091982 PCT ISR Dated Jul. 21, 2021 in Chinese 3 pages.

PCT/CN2021/091982 PCT International Preliminary Report on Patentability, Written Opinion of the International Searching Authority, dated Nov. 17, 2022, in English, 4 pages.

PCT/CN2021/091987 PCT ISR Dated Jul. 27, 2021 in Chinese, 4 pages.

PCT/CN2021/091987 PCT ISR Dated Jul. 20, 2021 in Chinese, 5 pages.

PCT/CN2021/091987 PCT International Preliminary Report on Patentability, Written Opinion of the International Searching Authority dated Nov. 17, 2022, in English, 6 pages.

R3-200240, 3GPP TSG-RAN WG3 Meeting #107-e, E-Meeting, Feb. 24-Mar. 6, 2020, 3 pages.

Xiao et al. Research on 5G Co-construction and Sharing Technology, 1994-2020 China Academic Journal Electronic Publishing House, http://www.cnki.net, 4 pages.

Zhang Zhirongl et al, Research on 5G network co-construction and sharing technology[J]. Application of Electronic Technique, 2020, 46(4): 1-5, 7 pages.

3GPP TR 38.801 V2.0.0 (Mar. 2017) Technical Report, 3rd Generation Partnership Project; Technical Specification Group Radio Access Network; Study on New Radio Access Technology; Radio Access Architecture and Interfaces (Release 14), 90 pages.

Claudia D. Van Borkulo et al., A new method for constructing networks from Binary data, Scientific Reports, 4:5918, DOI: 10.1038/srep05918, 10 pages.

* cited by examiner ized
HANDOVER METHOD, DEVICE AND SYSTEM IN MULTI-CONNECTION NETWORK

CROSS-REFERENCE TO RELATED APPLICATIONS

The present disclosure is a U.S. National Stage Application under 35 U.S.C. § 371 of International Patent Application No. PCT/CN2021/091987, filed on May 7, 2021, which is based on and claims priority of Chinese application for invention No. 202010477384.1 filed on May 29, 2020, the disclosures of both of which are hereby incorporated into this disclosure by reference in its entirety.

TECHNICAL FIELD

The present disclosure relates to the field of communication technologies, and in particular, to a handover method, a network device and a system in a multi-connectivity network.

BACKGROUND

With a rapid development of the mobile Internet, users have gradually increased requirements for the network rate. In order to meet users' requirements for business rate, the 5G (5th Generation) mobile network has been implemented and deployed. With the implementation of 5G networks, at present, there are a plurality of standards of mobile communication networks, such as 5G networks, 4G (4th Generation) mobile networks, and 3G (3th Generation) mobile networks, etc. In a mobile network environment where mobile networks of different standards coexist, a multi-connectivity technology enables a user terminal to aggregate business rates of mobile networks of different standards to increase a transmission rate, thereby improving a user's business experience in a multi-connectivity network.

In the multi-connectivity network comprising a core network and an access network, the access network generally adopts a network architecture in which a control plane and a user plane are separated from each other. For example, in a NSA (Non-Standalone) scenario of 5G, Option 3, 4, 7, and 8 have been proposed for 3GPP (3rd Generation Partnership Project), which enable a terminal to establish a connection with a 4G base station and a connection with a 5G base station at the same time (dual-connectivity). At present, a mainstream networking mode is Option 3. Because a deployment frequency of a 4G base station is lower than that of a 5G base station, a coverage of the 4G base station is larger than that of the 5G base station. Therefore, in Option 3, the 4G base station is responsible for a transmission of control plane information, while the 5G base station and the 4G base station are together responsible for a transmission of user plane data through a dual-connectivity technology, so as to achieve a purpose of aggregating performances of the 4G and 5G networks.

According to three specific implementations comprised in Option 3, the user plane data of a terminal can be transmitted in three manners. As shown in FIG. 1, Option 3 specifically comprises: Option 3, Option 3a, and Option 3x, in which the transmission of the control plane information is shown by dotted arrows, and the transmission of the user plane data is shown by solid arrows. In Option 3, the user plane data of the terminal is split to the 5G base station through the 4G base station; in Option 3a, the user plane data of the terminal is split to the 4G base station and the 5G base station through the core network (EPC, Evolved Packet Core network), for example, the user plane data of the terminal is split to the 4G base station and the 5G base station through a SGW (Serving Gateway) in EPC; In Option 3x, the user plane data of the terminal is split to the 4G base station through the 5G base station. Protocol stacks of the 4G and 5G base stations comprise, for example, a PDCP (Packet Data Convergence Protocol) layer, a RLC (Radio Link Control) layer, and a MAC (Media Access Control) layer, a PHY (Physical) layer, etc. Both the 4G base station and the 5G base station are connected to the EPC (Evolved Packet Core). The 4G base station is, for example, an LTE (Long Term Evolution) base station, and the 5G base station is, for example, an NR (New Radio) base station.

At present, due to a high cost of constructing 5G networks, it is desired to co-construct and share the 5G networks by multiple operators in different regions to save investments of the 5G networks. 5G users of various sharing operators can use the 5G networks constructed by different operators. For example, in a network co-construction and sharing mode, infrastructures of the 5G networks can be set up by operator A in some cities, by operator B in other cities, and by operator C in further cities. In the NSA scenario, the 4G base station is generally an anchor of the 5G base station. Therefore, a local construction operator shares the control plane of the 4G network with other operators, so that users of other sharing operators can access the NSA network. When the a terminal is moving in a boundary area of co-constructed and shared networks constructed by different operators, due to the change of the construction operator, a control plane channel of a 4G network of the terminal needs to be handed over, and a user plane channel also needs to be switched.

SUMMARY

According to some embodiments of the present disclosure, a handover method in a multi-connectivity network is provided, comprising: determining a type of a user of a terminal during a handover procedure of the terminal to a multi-connectivity network of the construction operator, wherein the type comprising: a first type indicating that the user is a user of a sharing operator or a second type indicating that the user is a user of the construction operator; determining a user plane split policy corresponding to the terminal according to the type of the user of the terminal; and switching a user plane channel of the terminal to a user plane channel of a first standard network of the construction operator, in a case that the user plane split policy corresponding to the terminal is split-disabled, and switching the user plane channel of the terminal to the user plane channel of the first standard network and a user plane channel of a second standard network of the construction operator, in a case that the user plane split policy corresponding to the terminal is split-enabled.

In some embodiments, determining the user plane split policy corresponding to the terminal according to the type of the user of the terminal comprises: determining that the user plane split policy corresponding to the terminal is split-disabled, in a case that the type of the user of the terminal is the first type; and determining that the user plane split policy corresponding to the terminal is split-enabled, in a case that the type of the user of the terminal is the second type.

In some embodiments, determining the user plane split policy corresponding to the terminal according to the type of the user of the terminal comprises: determining the user plane split policy corresponding to the terminal, according to the type of the user of the terminal and an occupancy rate of user plane air interface resources provided by a base station in the second standard network and occupied by all terminals, of which users are of the same type as the terminal, in a case that a networking mode comprises splitting user plane data from the base station in the second standard network or splitting user plane data from a base station in the first standard network.

In some embodiments, determining the user plane split policy corresponding to the terminal, according to the type of the user of the terminal and the occupancy rate of the user plane air interface resources provided by the base station in the second standard network and occupied by all terminals, of which users are of the same type as the terminal comprises: determining whether the occupancy rate of the user plane air interface resources provided by the base station in the second standard network and occupied by all terminals belonging to users of the sharing operator reaches a threshold, in a case that the type of the user of the terminal is the first type, determining that the user plane split policy corresponding to the terminal is split-disabled, in a case that the occupancy rate reaches the threshold, and determining that the user plane split policy corresponding to the terminal is split-enabled, in a case that the occupancy rate does not reach the threshold; and determining that the user plane split policy corresponding to the terminal is split-enabled, in a case that the type of the user of the terminal is the second type.

In some embodiments, the method further comprises: after determining the user plane split policy corresponding to the terminal, storing the user plane split policy corresponding to the terminal in association with identification information of the terminal.

In some embodiments, storing the user plane split policy corresponding to the terminal in association with the identification information of the terminal comprises: setting a split switch of a user plane channel of the second standard network corresponding to the identification information of the terminal to an off state, in a case of determining that the user plane split policy corresponding to the terminal is split-disabled; and setting the split switch of the user plane channel of the second standard network corresponding to the identification information of the terminal to an on state, in a case of determining that the user plane split policy corresponding to the terminal is split-enabled.

In some embodiments, determining the type of the user of the terminal comprises: obtaining identification information of the terminal from control plane information or through an interface with a network device to which the terminal is connected before the handover procedure of the terminal, in response to receiving the control plane information of the terminal; determining the type of the user of the terminal according to the identification information of the terminal.

In some embodiments, determining the type of the user of the terminal during the handover procedure of the terminal to the multi-connectivity network of the construction operator comprises: in a case that an interface is set between the network device of the construction operator and a network device to which the terminal is connected before the handover procedure of the terminal, obtaining a Public Land Mobile Network (PLMN) number of the terminal through the interface, and determining the type of the user of the terminal according to the PLMN number; or in a case that no interface is set between the network device of the construction operator and a network device to which the terminal is connected before the handover procedure of the terminal, the PLMN number of the terminal through a Radio Resource Control (RRC) connection establishment process with the terminal, and determining the type of the user of the terminal according to the PLMN number.

In some embodiments, the method further comprises: switching a control plane of the terminal to a control plane channel of the second standard network of the construction operator.

In some embodiments, the split switch is set at a base station in the second standard network, in a case that a networking mode comprises splitting user plane data from the base station in the second standard network or splitting user plane data from a base station in the first standard network, and the split switch is set at a core network device, in a case that the networking mode comprises splitting user plane data from the core network of the second standard network.

In some embodiments, the first standard network is a Fifth-Generation mobile network, and the second standard network is a Fourth-Generation mobile network or a Third-Generation mobile network.

According to still other embodiments of the present disclosure, a network device in a multi-connectivity network is provided, comprising: a processor; a memory coupled to the processor and storing instructions that when executed by the processor, cause the processor to: determine a type of a user of a terminal during a handover procedure of the terminal to a multi-connectivity network of the construction operator, wherein the type comprising: a first type indicating that the user is a user of a sharing operator or a second type indicating that the user is a user of the construction operator; determine a user plane split policy corresponding to the terminal according to the type of the user of the terminal; and switch a user plane channel of the terminal to a user plane channel of a first standard network of the construction operator, in a case that the user plane split policy corresponding to the terminal is split-disabled, and switch the user plane channel of the terminal to the user plane channel of the first standard network and a user plane channel of a second standard network of the construction operator, in a case that the user plane split policy corresponding to the terminal is split-enabled.

In some embodiments, determining the user plane split policy corresponding to the terminal according to the type of the user of the terminal comprises: determining that the user plane split policy corresponding to the terminal is split-disabled, in a case that the type of the user of the terminal is the first type; and determining that the user plane split policy corresponding to the terminal is split-enabled, in a case that the type of the user of the terminal is the second type.

In some embodiments, determining the user plane split policy corresponding to the terminal according to the type of the user of the terminal comprises: determining the user plane split policy corresponding to the terminal, according to the type of the user of the terminal and an occupancy rate of user plane air interface resources provided by a base station in the second standard network and occupied by all terminals, of which users are of the same type as the terminal, in a case that a networking mode comprises splitting user plane data from the base station in the second standard network or splitting user plane data from a base station in the first standard network.

In some embodiments, determining the user plane split policy corresponding to the terminal, according to the type of the user of the terminal and the occupancy rate of the user plane air interface resources provided by the base station in the second standard network and occupied by all terminals, of which users are of the same type as the terminal comprises: determining whether the occupancy rate of the user plane air interface resources provided by the base station in the second standard network and occupied by all terminals belonging to users of the sharing operator reaches a threshold, in a case that the type of the user of the terminal is the first type, determining that the user plane split policy corresponding to the terminal is split-disabled, in a case that the occupancy rate reaches the threshold, and determining that the user plane split policy corresponding to the terminal is split-enabled, in a case that the occupancy rate does not reach the threshold; and determining that the user plane split policy corresponding to the terminal is split-enabled, in a case that the type of the user of the terminal is the second type.

In some embodiments, the memory further storing computer programs, when executed by a processor, cause the processor to store the user plane split policy corresponding to the terminal in association with identification information of the terminal to the memory.

In some embodiments, storing the user plane split policy corresponding to the terminal in association with the identification information of the terminal comprises: setting a split switch of a user plane channel of the second standard network corresponding to the identification information of the terminal to an off state, in a case of determining that the user plane split policy corresponding to the terminal is split-disabled; and setting the split switch of the user plane channel of the second standard network corresponding to the identification information of the terminal to an on state, in a case of determining that the user plane split policy corresponding to the terminal is split-enabled.

In some embodiments, determining the type of the user of the terminal comprises: obtaining identification information of the terminal from control plane information or through an interface with a network device to which the terminal is connected before the handover procedure of the terminal, in response to receiving the control plane information of the terminal; and determining the type of the user of the terminal according to the identification information of the terminal.

According to still other embodiments of the present disclosure, there is provided a non-transitory computer-readable storage medium storing computer programs, when executed by a processor, cause the processor to: determine a type of a user of a terminal during a handover procedure of the terminal to a multi-connectivity network of the construction operator, wherein the type comprising: a first type indicating that the user is a user of a sharing operator or a second type indicating that the user is a user of the construction operator; determine a user plane split policy corresponding to the terminal according to the type of the user of the terminal; and switch a user plane channel of the terminal to a user plane channel of a first standard network of the construction operator, in a case that the user plane split policy corresponding to the terminal is split-disabled, and switch the user plane channel of the terminal to the user plane channel of the first standard network and a user plane channel of a second standard network of the construction operator, in a case that the user plane split policy corresponding to the terminal is split-enabled.

According to still other embodiments of the present disclosure, there is provided a system in a multi-connectivity network, comprising: a network device in a multi-connectivity network according to any of the foregoing embodiments; and a terminal configured to be handed over to the multi-connectivity network of the construction operator, transmit the user plane data through the user plane channel of the first standard network of the construction operator, in a case that the user plane split policy corresponding to the terminal is split-disabled, and transmit the user plane data through the user plane channel of the first standard network and the user plane channel of the second standard network of the construction operator, in a case that the user plane split policy corresponding to the terminal is split-enabled.

Other features and advantages of the present invention will become apparent from the following detailed description of exemplary embodiments of the present disclosure with reference to the accompanying drawings.

BRIEF DESCRIPTION OF THE DRAWINGS

The accompanying drawings, which are comprised to provide a further understanding of the present disclosure and are incorporated in and constitute a part of this specification, illustrate embodiments of the invention, and together with the illustrative embodiments of the present application serve to explain the present disclosure, but are not limitation thereof.

DETAILED DESCRIPTION

Figure 1:
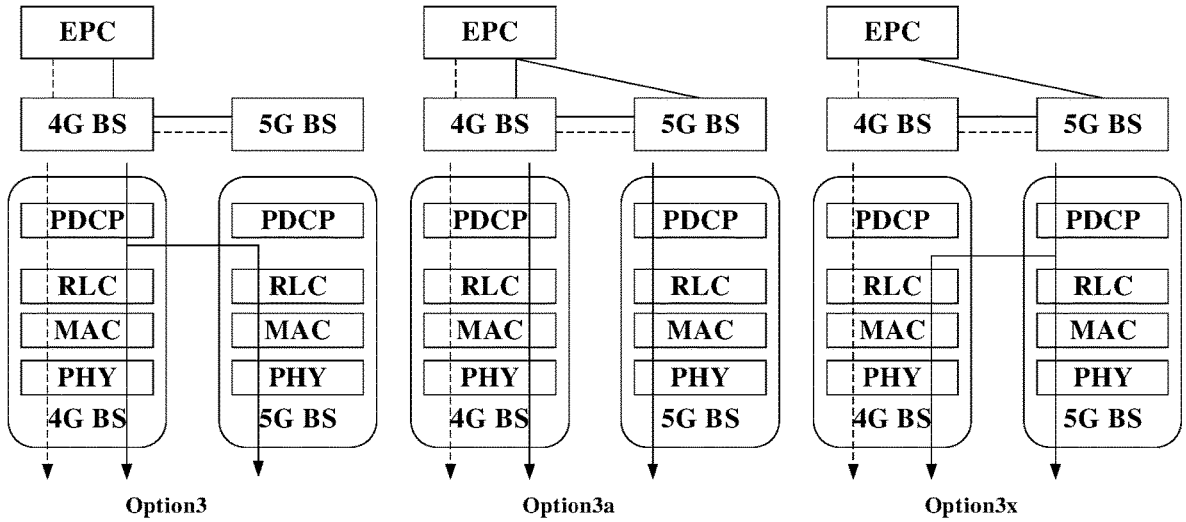
FIG. 1 shows a schematic diagram of a dual-connectivity mode of a NSA network according to some embodiments of the present disclosure.

Below, a clear and complete description will be given for the technical solution of embodiments of the present disclosure with reference to the figures of the embodiments. Obviously, merely some embodiments of the present disclosure, rather than all embodiments thereof, are given herein. The following description of at least one exemplary embodiment is in fact merely illustrative and is in no way intended as a limitation to the invention, its application or use. All other embodiments obtained by those of ordinary skill in the art based on the embodiments of the present disclosure without creative efforts shall fall within the protection scope of the present disclosure.

The inventors have found that in the three specific implementations of Option 3, a 5G base station and a 4G base station are together responsible for a transmission of user plane data through a dual connection technology. At present, due to inconsistent progress of 4G network construction of various operators, it is generally desired to operate 4G user planes separately without sharing, or to flexibly control a degree of sharing a 4G user plane with users of other operators. Based on the three specific implementations of Option 3, in a handover procedure of a terminal in a border area between co-constructed and shared networks, when the terminal is handed over to a network constructed by any operator, a user plane channel of the terminal needs to be switched to a 4G user plane channel and a 5G user plane channel of the operator. In this situation, it is still necessary for a 5G base station and a 4G base station to take charge of a transmission of user plane data, which however does not meet needs of operators. Generalized to other multi-connectivity networks, in a handover procedure of a terminal in a border area between co-constructed and shared networks, a user attribute of the terminal is different for different operators. In a situation of handing over the terminal to a network of a construction operator, it may be desired by the construction operator to share a user plane of a first standard network with a user of other sharing operator, while flexibly controlling a degree of sharing a user plane of a second standard network with the user of other sharing operator. Therefore, a problem to be solved is, in a handover procedure of a terminal, how to realize a sharing of the user plane of the first standard network in a case that a sharing degree of the user plane of the second standard network is controllable.

A technical problem to be solved by the present disclosure is in a handover procedure of a terminal, how to realize a flexible control of the sharing degree of the user plane of the second standard network based on a requirement, while enabling the sharing of the first standard network.

The present disclosure provides a handover method in a multi-connectivity network, which will be described below with reference to FIGS. 2 to 4B. A user plane channel and a control plane channel in the present disclosure are logical channels, respectively referring to a resource used for transmitting user plane data and a resource for transmitting control plane information.

Figure 2:
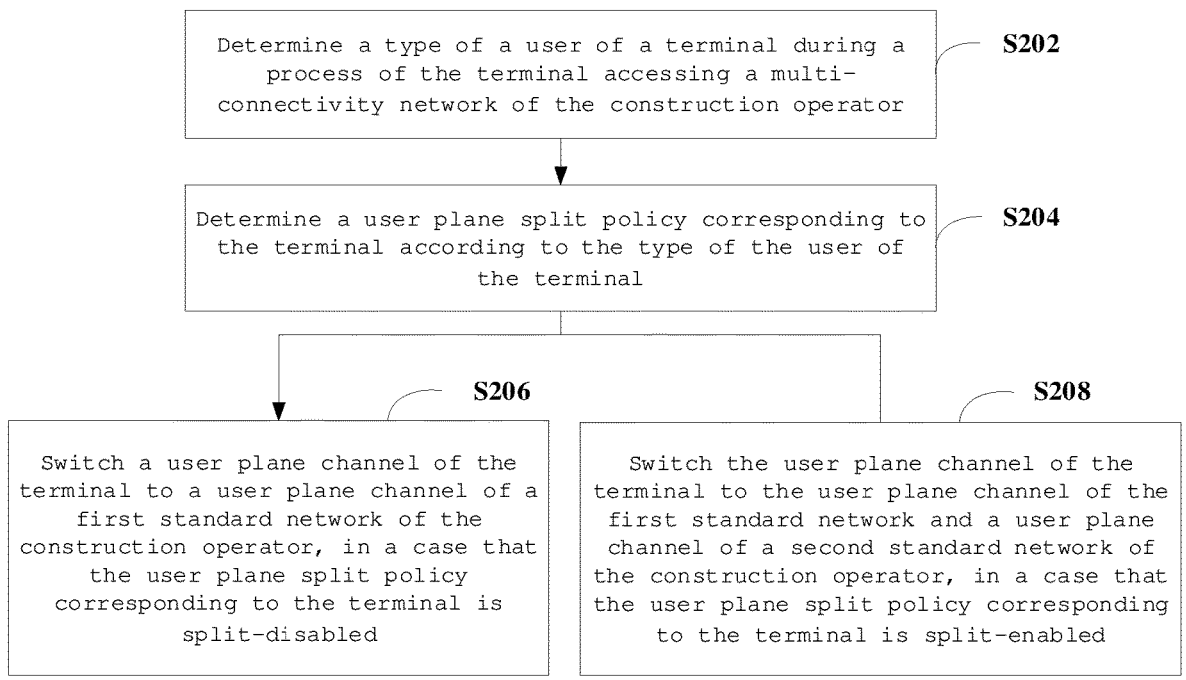
FIG. 2 shows a schematic flowchart of a handover method in a multi-connectivity network according to some embodiments of the present disclosure.

FIG. 2 is a flowchart of a handover method in a multi-connectivity network according to some embodiments of the present disclosure. As shown in FIG. 2, the method of these embodiments comprises: steps S202 to S208.

In step S202, a network device of a construction operator determines a type of a user of a terminal during a handover procedure of the terminal to a multi-connectivity network of the construction operator.

In a network co-constructed and sharing mode, the construction operator is an operator responsible for constructing a network in a certain region, and a sharing operator is another operator who shares part or all of the network with the construction operator. The multi-connectivity network of the construction operator that the terminal accesses comprises at least two standard networks, for example, the first standard network and the second standard network, wherein the terminal is connected to the different standard networks respectively. For example, the first standard network is a Fifth-Generation mobile network, and the second standard network is a Fourth-Generation mobile network or a Third-Generation mobile network.

For example, in a case that a networking mode comprises splitting user plane data from a base station in the second standard network or splitting user plane data from a base station in the first standard network, the network device of the construction operator is the base station in the second standard network. In a case that the networking comprises splitting user plane data from a core network of the second standard network, the network device of the construction operator is a core network device. If the first standard network is a 5G network and the second standard network is a 4G network, the network device of the construction operator of the above three cases may correspond to a specific network device in the Option 3, Option 3x, and Option 3a scenarios, respectively. The network device of the construction operator acts as a target network device in the handover procedure, and the terminal is handed over from a source network device to the network device of the construction operator. The network devices (to which the terminal is connected) before and after the handover procedure may belong to a same operator or different operators, and this solution is applicable to both of these situations.

The type of the user of the terminal comprises: a first type indicating that the user is a user of a sharing operator or a second type indicating that the user is a user of the construction operator. In some embodiments, the network device of the construction operator obtains identification information of the terminal from control plane information or through an interface with a network device to which the terminal is connected before the handover procedure of the terminal, in response to receiving the control plane information of the terminal, and then determines the type of the user of the terminal according to the identification information of the terminal. For example, the control plane information comprises: information in an RRC (Radio Resource Control) connection establishment process between the network device of the construction operator and the terminal; and the identification information of the terminal comprises a PLMN (Public Land Mobile Network) number of the terminal. For example, the identification information of the terminal comprises IMSI (International Mobile Subscriber Identity), which comprises a PLMN number. The control plane information may also comprise a signaling in another access procedure, such as Attach Request, etc., which is not limited to the illustrated examples.

Since operators has different PLMN numbers, operator attributes of users (the types of the users) of different terminals can be identified based on the PLMN numbers. In some embodiments, in a case that an interface is set between the network device of the construction operator and a network device to which the terminal is connected before the handover procedure of the terminal, the network device of the construction operator obtains a PLMN number of the terminal through the interface, and determines the type of the user of the terminal according to the PLMN number. Network devices of different operators may or may not have interfaces therebetween. If such an interface is present, the network device to which the terminal is connected before the handover procedure of the terminal can send, through the interface, the PLMN number to the network device of the construction operator to which the terminal is connected after the handover procedure of the terminal.

In other embodiments, in a case that no interface is set between the network device of the construction operator and a network device to which the terminal is connected before the handover procedure of the terminal, the network device of the construction operator obtains the PLMN number of the terminal from a signaling in the handover process procedure. For example, in a case that the network device of the construction operator is a base station of a second standard network, the network device of the construction operator obtains the PLMN number of the terminal through a RRC connection establishment procedure with the terminal, and determines the type of the user of the terminal according to the PLMN number. The PLMN number comprises an MCC (Mobile Country Code) and an MNC (Mobile Network Code), and an operator network to which the user belongs can be determined based on the MNC. The handover procedure in a multi-connectivity network comprises a procedure of establishing a RRC connection between the terminal and a base station. For the handover procedure, reference can be made to the prior art, which will not be repeated here. In this solution, the PLMN number of the terminal is identified from signaling in the handover procedure, thereby determining the type of the user of the terminal.

In step S204, the network device of the construction operator determines a user plane split policy corresponding to the terminal according to the type of the user of the terminal.

The user plane split policy can be a user-level setting, that is, a user plane split policy is correspondingly set for a user of each terminal. The user plane split policy of the terminal may comprise: split-disabled and split-enabled. Split-disabled means that user plane data of the terminal is prohibited from being split to a network that is not shared by the construction operator with the terminal. Split-enabled means that user plane data of the terminal is allowed to be split to every network of the construction operator. In some embodiments, in a case that the user of the terminal is a user of a sharing operator, i.e., the type of the user is the first type, the network device of the construction operator determines that the user plane split policy corresponding to the terminal is split-disabled, and in a case that the user of the terminal is a user of the construction operator, i.e., the type of the user is the second type, the network device of the construction operator determines that the user plane split policy corresponding to the terminal is split-enabled.

In other embodiments, the construction operator can control a sharing degree of a user plane channel of a certain network (such as the second standard network) to a user of a sharing operator, and the sharing degree can be determined through a negotiation between the construction operator and the sharing operator. For example, the construction operator can share of user plane air interface resources of the base station in the second standard network with a sharing operator in a certain proportion. Since information of the user plane air interface resources is mainly obtained by the base station, in a case that a networking mode comprises splitting user plane data from the base station in the second standard network or splitting user plane data from a base station in the first standard network, the network device of the construction operator determines the user plane split policy corresponding to the terminal, according to the type of the user of the terminal and an occupancy rate of user plane air interface resources provided by a base station in the second standard network and occupied by all terminals, of which users are of the same type as the terminal. For Option 3, Option 3a, and Option 3x, the above method is mainly applicable to Option 3 and Option 3x. The occupancy rate is a ratio of user plane air interface resources occupied by all terminals, of which users are of the same type as the terminal to all user plane air interface resources provided by the base station in the second standard network.

Furthermore, in a case that the user of the terminal is a user of the construction operator, the network device of the construction operator determines whether the occupancy rate of the user plane air interface resources provided by the base station in the second standard network and occupied by all terminals belonging to users of the sharing operator reaches a threshold, determines that the user plane split policy corresponding to the terminal is split-disabled, in a case that the occupancy rate reaches the threshold, and determines that the user plane split policy corresponding to the terminal is split-enabled, in a case that the occupancy rate does not reach the threshold. That is, if the user plane air interface resources of the base station in the second standard network occupied by users of the sharing operator connected to the base station in the second standard network reaches the threshold, the terminal is set to split-disabled after being handed over the multi-connectivity network. In a case that the user of the terminal is a user of the construction operator, the network device of the construction operator determines that the user plane split policy corresponding to the terminal is split-enabled. For example, the user plane air interface resources are user plane air interface channel resources or user plane air interface path resources.

In step S206, the network device of the construction operator switches a user plane channel of the terminal to a user plane channel of a first standard network of the construction operator, in a case that the user plane split policy corresponding to the terminal is split-disabled.

In step S208, the network device of the construction operator switches the user plane channel of the terminal to the user plane channel of the first standard network and a user plane channel of a second standard network of the construction operator, in a case that the user plane split policy corresponding to the terminal is split-enabled.

In some embodiments, in a case that the network device of the construction operator is a core network device, the core network device transmits the user plane split policy of the terminal to the base station in the second standard network (that is, a base station responsible for the control plane). The base station in the second standard network allocates the user plane channel of the first standard network of the construction operator to the terminal, or allocates the user plane channel of the first standard network and the user plane channel of the second standard network of the construction operator to the terminal according to the user plane split policy. That is, the base station in the construction operator switches the user plane channel of the terminal to the user plane channel of the first standard network of the construction operator or switches the user plane channel of the terminal to the user plane channel of the first standard network and the user plane channel of a second standard network of the construction operator, according to the user plane split policy.

For the user plane channel of the terminal, a change in network standard may occur before and after the handover procedure. For example, if the user of the terminal is a user of the construction operator, and within a border area between co-constructed and shared networks, the terminal located in a network of a sharing operator before the handover procedure moves to a network of the construction operator, the terminal is changed from using originally a user plane channel of a first standard network of the sharing operator to using a user plane channel of a first standard network and a user plane channel of a second standard network of the construction operator after the handover procedure. If the user of the terminal is a user of a sharing operator, and within the border area between the co-constructed and shared networks, the terminal located in the network of the sharing operator before the handover procedure moves to the network of the construction operator, the terminal is changed from using originally a user plane channel of a first standard network and a user plane channel of a second standard network of the sharing operator to using only a user plane channel of a first standard network of the construction operator after the handover procedure.

The procedure of determining the user plane split policy corresponding to the terminal, according to the type of the user of the terminal and an occupancy rate of user plane air interface resources provided by a base station in the second standard network and occupied by all terminals, of which users are of the same type as the terminal is similar to the above procedure, may cause a change of the user plane split policy before and after the handover procedure of the terminal, thereby cause a change in network standard of the user plane channel, which will not be repeated here. Through the above process, user-level switching control operations are performed based on the type of the user, which can achieve the sharing of the user plane of the first standard network and the flexible control of the sharing degree of the user plane of the second standard network, thereby realizing a network sharing scheme in which the first standard network can be co-constructed for sharing, and the second standard network can operate relatively independently.

In the above embodiment, the network device of the construction operator identifies whether the user of the terminal is a user of the construction operator or a user of a sharing operator during the handover procedure of the terminal to the multi-connectivity network of the construction operator. the network device of the construction operator determines the user plane split policy corresponding to the terminal according to the user type of the terminal. In a case that the user plane split policy corresponding to the terminal is split-disabled, the network device of the construction operator switches the user plane channel of the terminal to the user plane channel of the first standard network of the construction operator. In a case that the user plane split policy corresponding to the terminal is split-enabled, the network device of the construction operator switches the user plane channel of the terminal to the user plane channel of the first standard network and the user plane channel of the second standard network of the construction operator.

When the terminal is handed over to a border area of a multi-connectivity co-constructed and shared network, the method of the above embodiments can achieve the flexible control of the sharing degree of the user plane of the second standard network based on a requirement while enabling the sharing of the first standard network. Flexible switching to the user plane channel of the second standard network can be realized based on different types of users of terminals. The above method is applicable to the NSA scenario. In a case that the first standard network is a 5G network and the second standard network is a 4G network, the sharing degree of the user plane of the 4G network can be flexibly controlled according to the type of the user, while enabling sharing of the 5G network by all users after handover. In this way, the goal of co-construction and sharing of the 5G network and relatively independent operation of the 4G network can be achieved, which can ensure the implementation of 5G network co-construction and sharing, and can reduce the cost of 5G network construction.

In a process of the terminal accessing a multi-connectivity network, the sharing of the user plane of the first standard network can be realized, while flexibly controlling the sharing degree of the user plane of the second standard network. For example, during the process of the terminal accessing the multi-connectivity network of the construction operator, the network device of the construction operator determines a type of a user of the terminal. The network device of the construction operator determines a user plane split policy corresponding to the terminal according to the type of the user of the terminal; the network device of the construction operator allocates a user plane channel of a first standard network of the construction operator to the terminal to transmit user plane data of the terminal, in a case that the user plane split policy corresponding to the terminal is split-disabled, and allocates the user plane channel of the first standard network and a user plane channel of a second standard network of the construction operator to the terminal to transmit the user plane data of the terminal, in a case that the user plane split policy corresponding to the terminal is split-enabled. For processes of determining of the type of the user of the terminal and determining of the user plane split policy, reference can be made to the handover procedure. Through a cooperation of the handover procedure and the access procedure, in an entire communication process, the sharing of the user plane of the first standard network can be realized, while flexibly controlling the sharing degree of the user plane of the second standard network.

Figure 3:
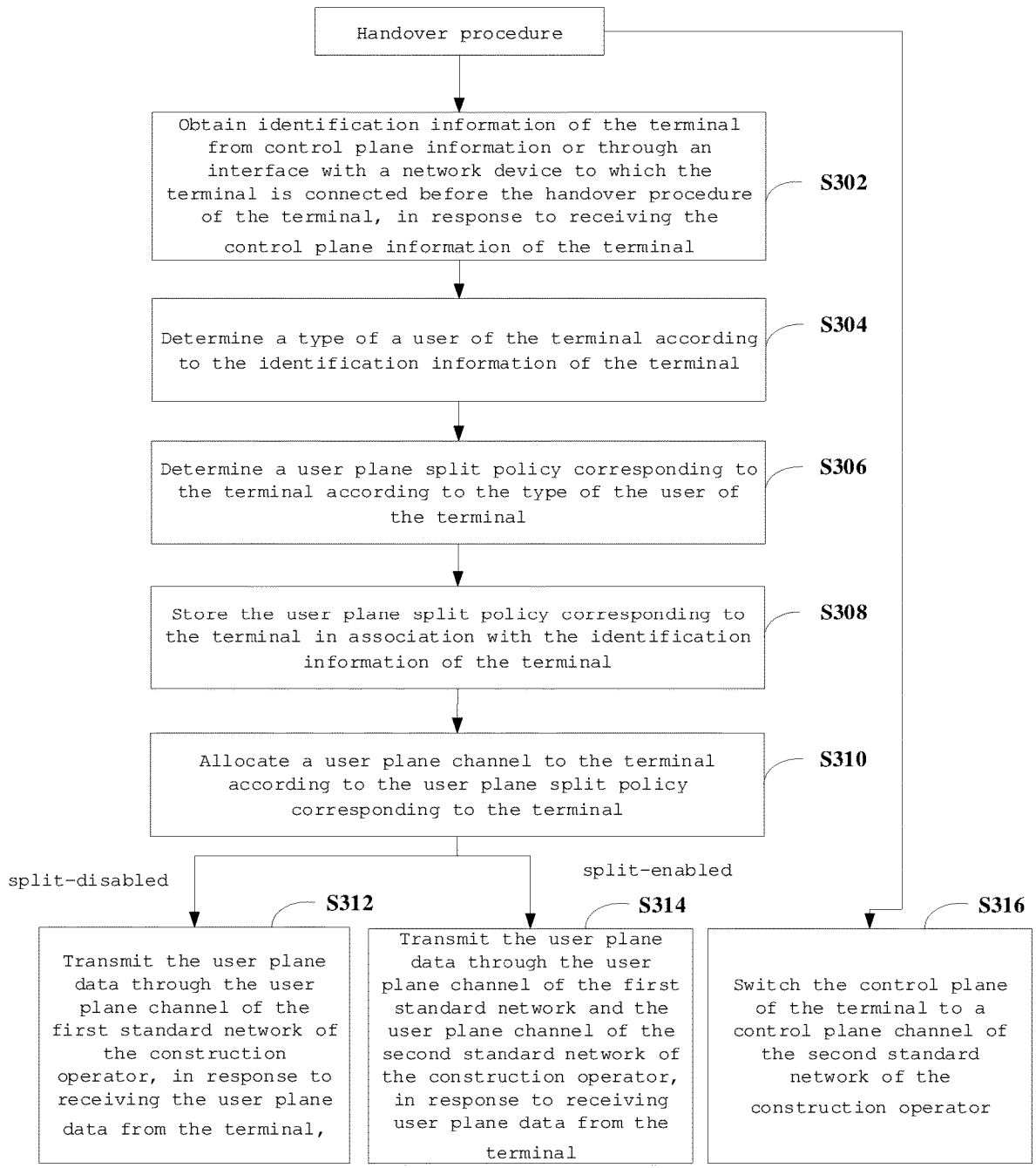
FIG. 3 shows a schematic flowchart of a handover method in a multi-connectivity network according to other embodiments of the present disclosure.

A flowchart of a handover method in a multi-connectivity network according to other embodiments of the present disclosure will be described below with reference to FIG. 3. As shown in FIG. 3, the method of these embodiments comprises: steps S302 to S316.

In step S302, a network device of a construction operator obtains identification information of the terminal from control plane information or through an interface with a network device to which the terminal is connected before the handover procedure of the terminal, in response to receiving the control plane information of the terminal.

In step S304, the network device of the construction operator determines a type of a user of the terminal according to the identification information of the terminal.

The identification information of the terminal comprises, for example, a PLMN number.

In step S306, the network device of the construction operator determines a user plane split policy corresponding to the terminal according to the type of the user of the terminal.

For the details of this step, reference can be made to the foregoing embodiment.

In step S308, the network device of the construction operator stores the user plane split policy corresponding to the terminal in association with the identification information of the terminal.

The user plane split policy can be stored as an item of attribute information of the terminal in association with the identification information of the terminal. For example, the user plane split policy can be represented by a numerical value, such as "1" for split-enabled and "0" for split-disabled. Here, the identification information of the terminal refers to information that can uniquely identify the terminal.

In some embodiments, a split switch can be correspondingly provided for a user of each terminal. The network device of the construction operator sets the split switch of a user plane channel of the second standard network corresponding to the identification information of the terminal to an off state, in a case of determining that the user plane split policy corresponding to the terminal is split-disabled, and sets the split switch of the user plane channel of the second standard network corresponding to the identification information of the terminal to an on state, in a case of determining that the user plane split policy corresponding to the terminal is split-enabled. The state of the split switch can be represented by a numerical value, for example, "1" for the on state and "0" for the off state, which however is not limited to the illustrated examples. In a case that the networking mode comprises splitting the user plane data from the base station in the second standard network or splitting the user plane data from the base station in the first standard network, the split switch can be set at the base station in the second standard network; in a case that networking comprises splitting the user plane data from the core network of the second standard network, the split switch can be set at a core network device.

In step S310, the network device of the construction operator allocates a user plane channel to the terminal according to the user plane split policy corresponding to the terminal, that is, switches the user plane channel of the terminal according to the user plane split policy corresponding to the terminal.

A user plane channel can be allocated for the terminal according to the state of the split switch. In a case that the networking mode comprises splitting the user plane data from the base station in the second standard network or splitting the user plane data from the base station in the first standard network, the network device of the construction operator may be the base station in the second standard network (a base station responsible for the control plane). In a case that the user plane split policy corresponding to the terminal is split-disabled, the base station in the second standard network allocates a user plane channel of the first standard network to the terminal, that is, the user plane channel of the terminal can be switched to the user plane channel of the first standard network. and in a case the user plane split policy corresponding to the terminal is split-enabled, the base station of the second standard network allocates a user plane channel of the first standard network and the user plane channel of the second standard network to the terminal, that is, the user plane channel of the terminal can be switched to the user plane channel of the first standard network and the user plane channel of the second standard network. The procedure of allocating the user plane channel comprises interactions between the base station in the second standard network and the base station in the first standard network. For this procedure, reference can be made to the prior art, and will not be repeated here.

In a case that the networking mode comprises splitting the user plane data from the core network of the second standard network, the network device of the construction operator may be a core network device. The control device transmits the user plane split policy corresponding to the terminal to the base station in the second standard network (a base station responsible for the control plane), and the base station in the second standard network allocates the user plane channel to the terminal according to the user plane split policy corresponding to the terminal.

In step S312, the network device of the construction operator transmits the user plane data through the user plane channel of the first standard network of the construction operator, in response to receiving the user plane data from the terminal, in a case that the user plane split policy corresponding to the terminal is split-disabled.

In step S314, the network device of the construction operator transmits the user plane data through the user plane channel of the first standard network and the user plane channel of the second standard network of the construction operator, in response to receiving user plane data from the terminal, in a case where the user plane split policy corresponding to the terminal is split-enabled.

In step S316, the network device of the construction operator switches the control plane of the terminal to a control plane channel of the second standard network of the construction operator.

Step S316 and steps S302 to S314 are parallel steps. The network device of the construction operator transmits control plane information of the terminal through a control plane channel of the second standard network of the construction operator, in response to receiving the control plane information from the terminal. The control plane information of all terminals can be transmitted through the control plane channel of the second standard network. The coverage of the second standard network is larger than that of the first standard network.

The solutions of the foregoing embodiments can be extended to a handover procedure of a terminal in multiple networks of different network standards. For example, For example, the first standard network may be replaced by one or more shared networks, that is, terminals of all types of users can transmit user plane data through a user plane channel(s) of the shared network(s) before or after the handover procedure. The second standard network can be replaced with one or more networks with controllable sharing degrees. For a terminal, it is required to determine a user plane split policy of this terminal according to the type of the user of the terminal, or according to the type of the user of the terminal and an occupancy rate of user plane air interface resources provided by a base station in the network with a controllable sharing degree and occupied by all terminals, types of users of which are the same as that terminal, of which users are of the same type as the terminal, so as to determine whether user plane data of the terminal can be transmitted through the network with a controllable sharing degree after the handover procedure. For the details of this scheme, reference can be made to the foregoing embodiments, which will not be repeated herein.

Taking an NSA dual-connectivity network supporting networking modes Option 3, Option 3a, and Option 3x and constructed by combining a 4G network and a 5G network as an example, a data transmission method in a multi-connectivity network will be described below with reference to FIGS. 4A and 4B.

Figure 4A:
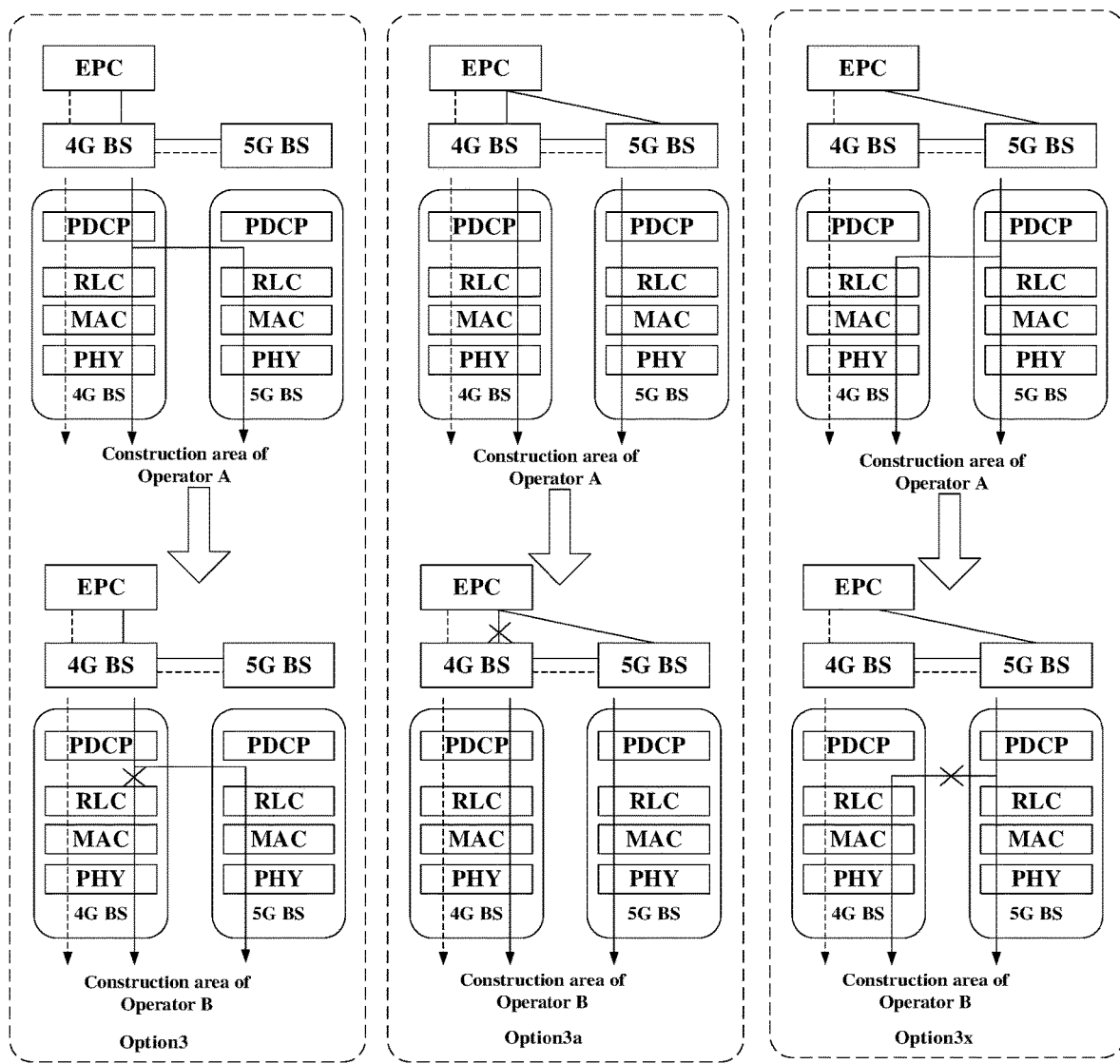
FIG. 4A shows a schematic diagram showing a change of dual-connectivity (DC) bearers in a handover procedure of a terminal in an NSA dual-connectivity network environment constructed by combining a 4G network and a 5G network according to some embodiments of the present disclosure.
Figure 4B:
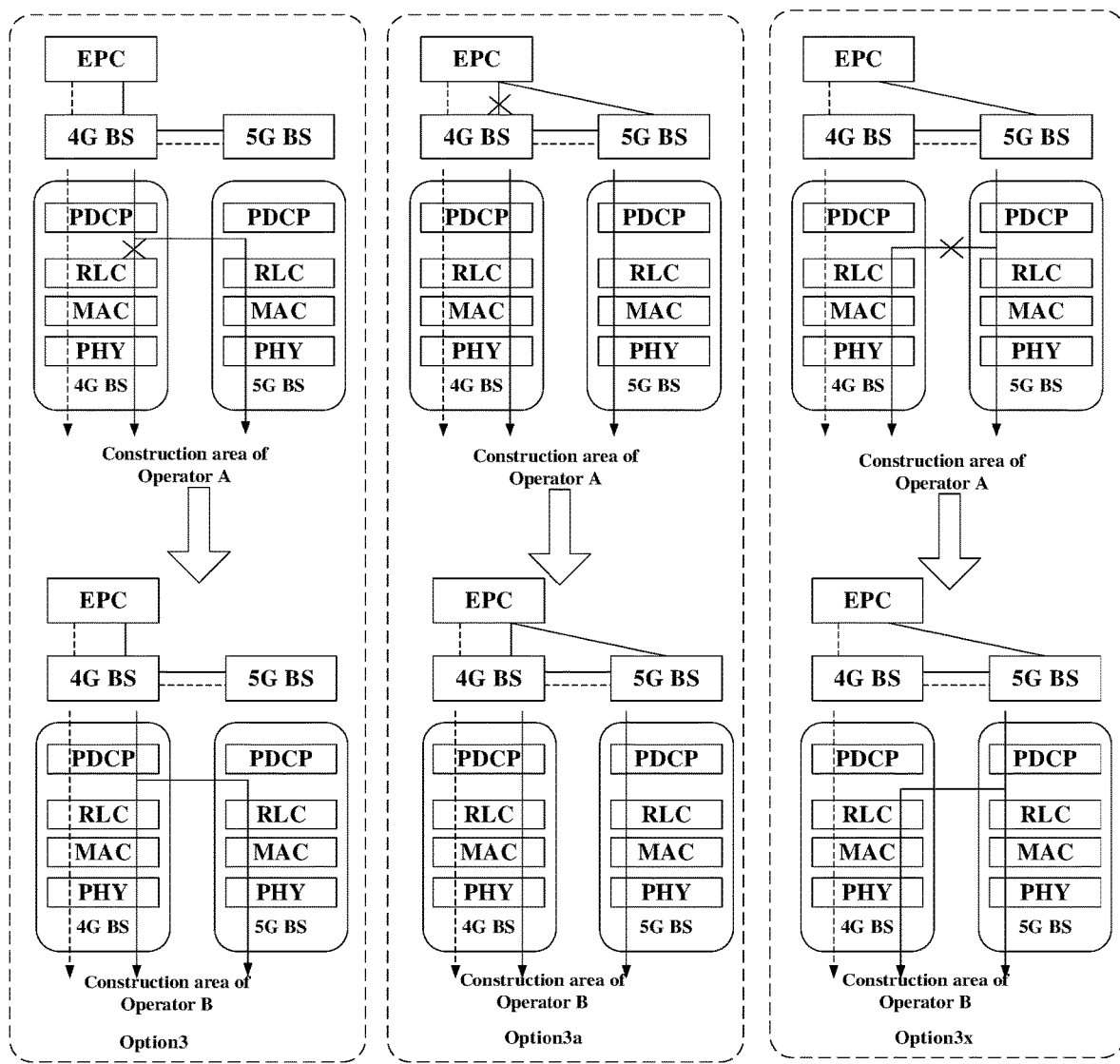
FIG. 4B shows a schematic diagram showing a change of dual-connectivity (DC) bearers in a handover procedure of a terminal in an NSA dual-connectivity network environment constructed by combining a 4G network and a 5G network according to other embodiments of the present disclosure.

As shown in FIGS. 4A and 4B, both a 4G base station and a 5G base station are connected to an EPC (Evolved Packet Core). Protocol stacks of the 4G base station and the 5G base station comprise, for example, a PDCP layer, a RLC layer, a MAC layer, a PHY layer, etc. A transmission of control plane information is shown by dashed arrows, and a transmission of user plane data is shown by solid arrows. Due to a high cost of constructing 5G networks, it is desired to co-construct and share the 5G networks by multiple operators in different regions to save investments of the 5G networks. 5G users of various sharing operators can use the 5G networks constructed by different operators. Since operators has different PLMN numbers, for different users, an operator attribute can be still identified in a co-constructed and shared 5G network. In a network co-construction and sharing mode, for each local network, a construction operator is responsible for the construction and operation of the 5G network in that region.

When a terminal accesses a shared multi-connectivity network, a network device of the construction operator extracts a PLMN number of the terminal from a signaling in the access procedure, and identifies whether the user of the terminal is a user of the construction operator or a user of a sharing operator. The user plane split policy of the terminal can be directly determined according to the type of the user. In Option 3 and Option 3x, the user plane split policy of the terminal can be further determined according to an occupancy rate of user plane air interface resources provided by the 4G base station of the construction operator and occupied by all terminals of the sharing operator(s).

For example, for any user having a PLMN number of the construction operator, the 4G user plane channel split switch is set to an on state, so that all the 5G users of the construction operator can use a local 4G network and a local 5G network simultaneously. For any user of the construction operator, the split switch of the 4G user plane channel corresponding to the user is set to an on state, so that user plane channels of both the local 4G network and the local 5G network can be used by all 5G dual-connectivity users of the construction operator. For a user of the sharing operator, the split switch of the 4G user plane channel corresponding to this user is set to an off state, so that all 5G dual-connectivity users of the sharing operator is only allowed to use the user plane channel of the local 5G network, and cannot use the user plane channel of the local 4G network.

Or in Option 3 and Option 3x, for the users of the sharing operator, if the occupation rate of user plane air interface resources of the local 4G network that are occupied by the users of the sharing operator reaches a threshold, for a subsequent access user of the sharing operator, the split switch of the 4G user plane channel corresponding to this user is set to an off state, thereby the user is only allowed to use the user plane channel of the local 5G network, and cannot use the user plane channel of the local 4G network. if the occupation rate of the user plane air interface resources of the local 4G network that are occupied by the users of the sharing operator does not reach the threshold, the split switch of the 4G user plane channel corresponding to a user of the sharing operator can be set to an on state, thereby the user of the sharing operator is allowed to use the user plane channels of both the local 4G network and the local 5G network. Of course, all 5G dual-connectivity users of the sharing operator can still use the control plane channel of the local 4G network to ensure the transmission of control plane information and a normal operation of the NSA network. Therefore, based on the above sharing solution, the goal of co-construction and sharing of 5G networks and relatively independent operation of 4G networks can be achieved.

When a terminal is in a border area between co-constructed and shared 5G networks constructed by different operators, due to a change of a construction operator, it is necessary to switch a 4G control plane channel for the terminal. Moreover, a user plane channel sharing policy of a user will also change due to a change of a type of the user with respect to an operator. Based on a strategy of sharing a control plane and flexible control of a degree of sharing a user plane channel, a control plane/user plane channel switching mechanism is designed in a scenario of moving in the border area between co-constructed and shared networks, mainly comprising a control plane switching mechanism, a recognition of a PLMN number of a user, an adjustment of a user plane split policy, etc., to ensure a use of services by the user in the border area between co-constructed and shared networks. Below, a handover method in a multi-connectivity network will be described in detail with reference to FIGS. 4A and 4B that show a channel switching process in scenarios of users of two types moving in the border area between co-constructed and shared networks, respectively.

As shown in FIG. 4A, for a terminal of a user of operator A, the terminal can use a control plane channel and a user plane channel of a 4G network in a construction area of operator A, and at a same time use a user plane channel of 5G NR constructed by operator A under a NSA working mechanism. When the terminal moves from the area constructed by operator A to an area constructed by operator B, the control plane channel of the 4G network of operator A needs to be switched to the control plane channel of a 4G network constructed by operator B. In this case, a network device of operator B identifies a PLMN number of the terminal during a handover process of the terminal, and learns that the user of the terminal is a user of a sharing operator of operator B. The user plane split policy of the terminal can be directly determined according to the type of the user. In Option 3 and Option 3x, the user plane split policy of the terminal can be further determined according to an occupancy rate of user plane air interface resources provided by a 4G base station of the operator B and occupied by all terminals of the sharing operator that are connected to the 4G base station of operator B.

For example, if the user plane split policy is split-disabled, the network device of operator B may allocate a control plane channel and a user plane channel to the terminal. The terminal can use a 4G control plane channel of operator B, but can only use a 5G user plane channel of operator B, i.e., the terminal cannot use a 4G user plane channel of operator B. From a perspective of an entire mobility management mechanism, the user of the terminal has completed a transition from a user of the construction operator to a user of the sharing operator. The user plane split policy of the terminal can be a user-level setting, which can be configured using a split switch. For example, for this terminal, if the user plane split policy is split-disabled, operator B can set the split switch of the 4G user plane channel corresponding to this terminal to an off state. In this way, this terminal can only use the 5G user plane channel of operator B, but cannot use the 4G user plane channel of operator B.

As shown in FIG. 4B, for a terminal of a user of operator B, the terminal is treated as a user of a sharing operator in an area constructed by operator A, and thus is allowed to use the 4G control plane channel of operator A, but can only use a 5G user plane channel of operator A. That is, the terminal is not allowed to use a 4G user plane channel of operator A. When the terminal moves from the area constructed by operator A to an area constructed by operator B, the 4G control plane channel of operator A needs to be switched to a control plane channel of a 4G network constructed by operator B. In this case, a network device of operator B identifies a PLMN number of the terminal during the handover procedure, and learns that the user of the terminal is a user of operator B. The network device of operator B then allocates a control plane channel and a user plane channel to the terminal. The terminal can use a 4G control plane channel of operator B, and can use a 4G user plane channel and a 5G user plane channel at the same time. From a perspective of an entire mobility management mechanism, the user has completed a transition from a user of a sharing operator to a user of a construction operator. The user plane split policy of the terminal can be a user-level setting, which can be configured using a split switch. For example, for this terminal, operator B can set the split switch of the 4G user plane channel corresponding to this terminal to an on state.

In this way, this terminal can use not only the 5G user plane channel of operator B, but also the 4G user plane channel of operator B.

In Option 3, for a user of each terminal, a state of the split switch of the 4G user plane channel can be set on a 4G base station side of the construction operator. For example, the state of the split switch of the 4G user plane channel can be set at the PDCP layer on the 4G base station side of the construction operator. In Option 3a, for a user of each terminal, a state of the split switch of the 4G user plane channel can be set on a core network side of the construction operator. In Option 3x, for a user of each terminal, a state of the split switch of the 4G user plane channel can be set on the 4G base station side of the construction operator. Operators A and B may correspond to different Options, and the principle is the same as that in the above embodiment, which will not be repeated here.

This solution can also be extended to various shared multi-connectivity networks. The 4G network link is equivalent to a connection channel with a best coverage in the multi-connectivity network, and the 5G network link is equivalent to a shared channel in the multi-connectivity network. The multi-connectivity network can be extended from 4G and 5G network connections in a NSA network to multiple network connections of different network standards.

The present disclosure further provides a network device in a multi-connectivity network, which will be described below with reference to FIG. 5.

Figure 5:
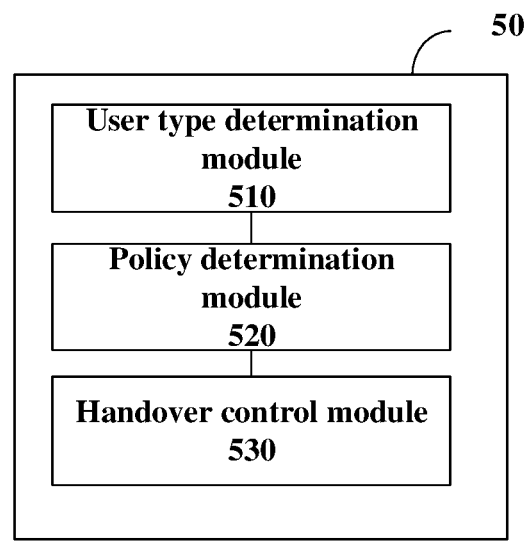
FIG. 5 shows a schematic structural diagram of a network device in a multi-connectivity network according to some embodiments of the present disclosure.

FIG. 5 is a structure diagram of a network device in a multi-connectivity network according to some embodiments of the present disclosure. As shown in FIG. 5, the device 50 of these embodiments comprises: a user type determination module 510, a policy determination module 520, and a handover control module 530.

The user type determination module 510 is configured to determine a type of a user of a terminal during a handover procedure of the terminal to a multi-connectivity network of the construction operator, wherein the type comprising: a first type indicating that the user is a user of a sharing operator or a second type indicating that the user is a user of the construction operator.

In some embodiments, the user type determination module 510 is configured to obtain identification information of the terminal from control plane information or through an interface with a network device to which the terminal is connected before the handover procedure of the terminal, in response to receiving the control plane information of the terminal; and determine the type of the user of the terminal according to the identification information of the terminal.

In some embodiments, the user type determination module 510 is configured to in a case that an interface is set between the network device of the construction operator and a network device to which the terminal is connected before the handover procedure of the terminal, obtain a Public Land Mobile Network (PLMN) number of the terminal through the interface, and determine the type of the user of the terminal according to the PLMN number; or in a case that no interface is set between the network device of the construction operator and a network device to which the terminal is connected before the handover procedure of the terminal, the PLMN number of the terminal through a Radio Resource Control (RRC) connection establishment process with the terminal, and determine the type of the user of the terminal according to the PLMN number.

The policy determination module 520 is configured to determine a user plane split policy corresponding to the terminal according to the type of the user of the terminal.

In some embodiments, the policy determination module 520 is configured to determine that the user plane split policy corresponding to the terminal is split-disabled, in a case that the type of the user of the terminal is the first type; and determine that the user plane split policy corresponding to the terminal is split-enabled, in a case that the type of the user of the terminal is the second type.

In some embodiments, the policy determination module 520 is configured to determine the user plane split policy corresponding to the terminal, according to the type of the user of the terminal and an occupancy rate of user plane air interface resources provided by a base station in the second standard network and occupied by all terminals, of which users are of the same type as the terminal, in a case that a networking mode comprises splitting user plane data from the base station in the second standard network or splitting user plane data from a base station in the first standard network.

In some embodiments, the policy determination module 520 is configured to determine whether the occupancy rate of the user plane air interface resources provided by the base station in the second standard network and occupied by all terminals belonging to users of the sharing operator reaches a threshold, in a case that the type of the user of the terminal is the first type, determine that the user plane split policy corresponding to the terminal is split-disabled, in a case that the occupancy rate reaches the threshold, and determine that the user plane split policy corresponding to the terminal is split-enabled, in a case that the occupancy rate does not reach the threshold; and determine that the user plane split policy corresponding to the terminal is split-enabled, in a case that the type of the user of the terminal is the second type.

The handover control module 530 is configured to switch a user plane channel of the terminal to a user plane channel of a first standard network of the construction operator, in a case that the user plane split policy corresponding to the terminal is split-disabled, and switch the user plane channel of the terminal to the user plane channel of the first standard network and a user plane channel of a second standard network of the construction operator, in a case that the user plane split policy corresponding to the terminal is split-enabled.

In some embodiments, the policy determination module 520 is further configured to store the user plane split policy corresponding to the terminal in association with identification information of the terminal, after determining the user plane split policy corresponding to the terminal.

In some embodiments, the policy determination module 520 is further configured to set a split switch of a user plane channel of the second standard network corresponding to the identification information of the terminal to an off state, in a case of determining that the user plane split policy corresponding to the terminal is split-disabled; and set the split switch of the user plane channel of the second standard network corresponding to the identification information of the terminal to an on state, in a case of determining that the user plane split policy corresponding to the terminal is split-enabled.

In some embodiments, the handover control module 530 is further configured to switch a control plane of the terminal to a control plane channel of the second standard network of the construction operator.

In some embodiments, the split switch is set at a base station in the second standard network, in a case that a networking mode comprises splitting user plane data from the base station in the second standard network or splitting user plane data from a base station in the first standard network, and the split switch is set at a core network device, in a case that the networking mode comprises splitting user plane data from the core network of the second standard network.

In some embodiments, the first standard network is a Fifth-Generation mobile network, and the second standard network is a Fourth-Generation mobile network or a Third-Generation mobile network.

The network device in a multi-connectivity network in the embodiments of the present disclosure may be implemented by various computing devices or computer systems, which will be described below with reference to FIGS. 6 and 7.

Figure 6:
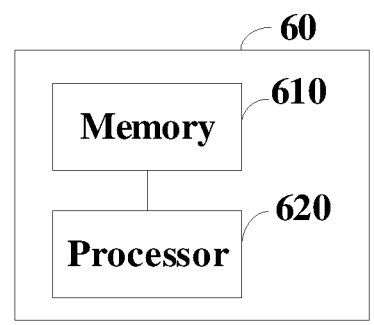
FIG. 6 shows a schematic structural diagram of a network device in a multi-connectivity network according to other embodiments of the present disclosure.

FIG. 6 is a structure diagram of a network device in a multi-connectivity network according to some embodiments of the present disclosure. As shown in FIG. 6, the network device 60 of this embodiment comprises: memory 610 and a processor 620 coupled to the memory 610, the processor 620 configured to, based on instructions stored in the memory 610, carry out the data transmission method in a multi-connectivity network according to any one of the embodiments of the present disclosure.

Wherein, the memory 610 may comprise, for example, system memory, a fixed non-volatile storage medium, or the like. The system memory stores, for example, an operating system, applications, a boot loader, a database, and other programs.

Figure 7:
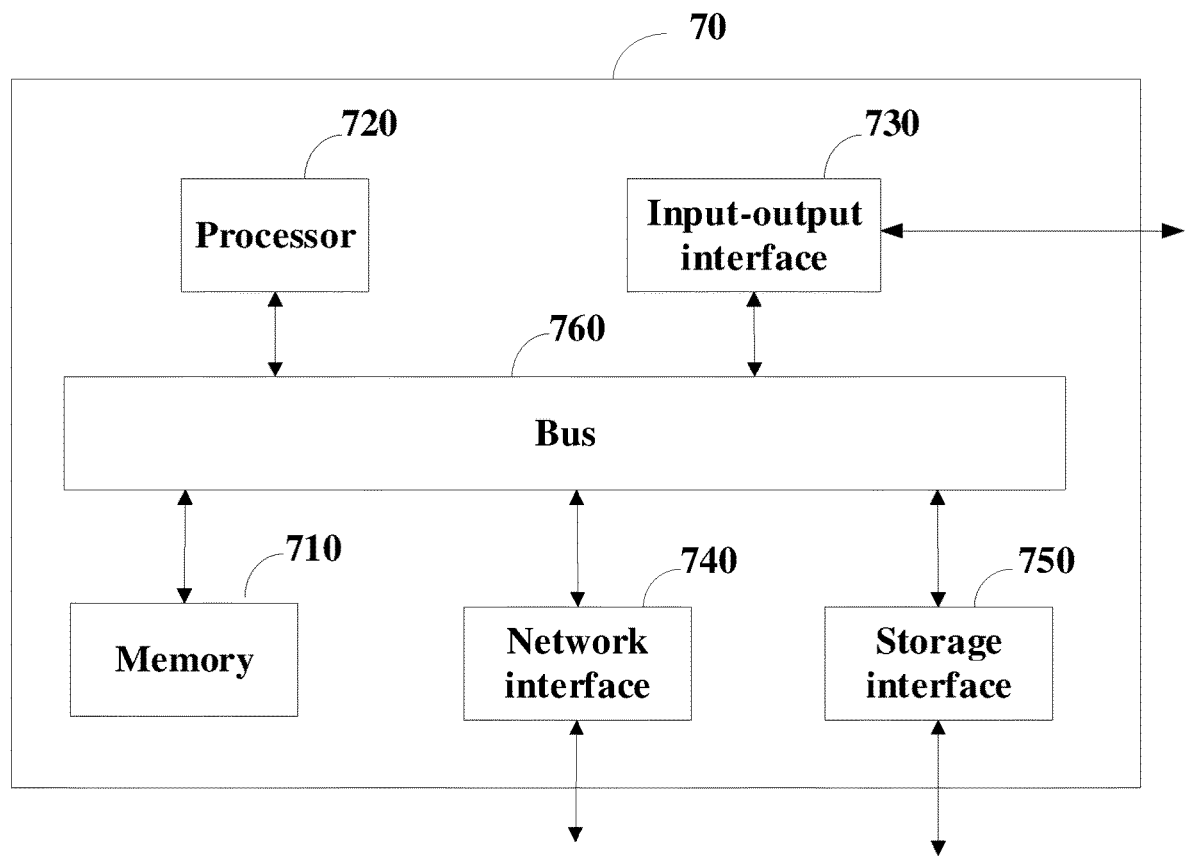
FIG. 7 shows a schematic structural diagram of a network device in a multi-connectivity network according to still other embodiments of the present disclosure.

FIG. 7 is a structure diagram of a network device in a multi-connectivity network according to other embodiments of the present disclosure. As shown in FIG. 7, the network device 70 of this embodiment comprises: a memory 710 and a processor 720 that are similar to the memory 610 and the processor 620, respectively. It may further comprise an input-output interface 730, a network interface 740, a storage interface 750, and the like. These interfaces 730, 740, 750, the memory 710 and the processor 720 may be connected through a bus 760, for example. Wherein, the input-output interface 730 provides a connection interface for input-output devices such as a display, a mouse, a keyboard, and a touch screen. The network interface 740 provides a connection interface for various networked devices, for example, it can be connected to a database server or a cloud storage server. The storage interface 750 provides a connection interface for external storage devices such as an SD card and a USB flash disk.

The present disclosure further provides a system in a multi-connectivity network, which will be described below with reference to FIG. 8.

Figure 8:
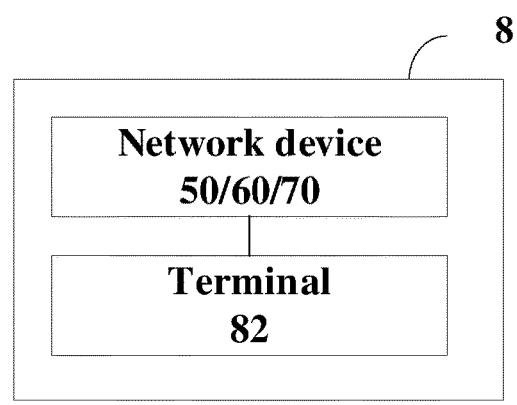
FIG. 8 shows a schematic flowchart of a system in a multi-connectivity network according to some embodiments of the present disclosure.

FIG. 8 is a structure diagram of a system in a multi-connectivity network according to some embodiments of the present disclosure. As shown in FIG. 8, the system 8 of this embodiment comprises: the network device 50/60/70 according to any one of the foregoing embodiments; and a terminal 82 configured for being switched to a multi-connectivity network of a construction operator, if a user plane split policy corresponding to the terminal 82 is split-disabled, transmitting user plane data through a user plane channel of a first standard network of the construction operator, and if the user plane split policy corresponding to the terminal 82 is split-enabled, transmitting user plane data through a user plane channel of a first standard network and a user plane channel of a second standard network of the construction operator.

Those skilled in the art should understand that the embodiments of the present disclosure may be provided as a method, a system, or a computer program product. Therefore, embodiments of the present disclosure can take the form of an entirely hardware embodiment, an entirely software embodiment or an embodiment containing both hardware and software elements. Moreover, the present disclosure may take the form of a computer program product embodied on one or more computer-usable non-transitory storage media (comprising but not limited to disk storage, CD-ROM, optical storage device, etc.) having computer-usable program code embodied therein.

The present disclosure is described with reference to flowcharts and/or block diagrams of methods, apparatuses (systems) and computer program products according to embodiments of the present disclosure. It should be understood that each process and/or block in the flowcharts and/or block diagrams, and combinations of the processes and/or blocks in the flowcharts and/or block diagrams may be implemented by computer program instructions. The computer program instructions may be provided to a processor of a general purpose computer, a special purpose computer, an embedded processor, or other programmable data processing device to generate a machine such that the instructions executed by a processor of a computer or other programmable data processing device to generate means implementing the functions specified in one or more flows of the flowcharts and/or one or more blocks of the block diagrams.

The computer program instructions may also be stored in a computer readable storage device capable of directing a computer or other programmable data processing apparatus to operate in a specific manner such that the instructions stored in the computer readable storage device produce an article of manufacture comprising instruction means implementing the functions specified in one or more flows of the flowcharts and/or one or more blocks of the block diagrams.

These computer program instructions can also be loaded onto a computer or other programmable device to perform a series of operation steps on the computer or other programmable device to generate a computer-implemented process such that the instructions executed on the computer or other programmable device provide steps implementing the functions specified in one or more flows of the flowcharts and/or one or more blocks of the block diagrams.

The above is merely preferred embodiments of this disclosure, and is not limitation to this disclosure. Within spirit and principles of this disclosure, any modification, replacement, improvement and etc. shall be contained in the protection scope of this disclosure.

What is claimed is:

1. A handover method in a multi-connectivity network, performed by a network device of a construction operator, comprising:
   determining a type of a user of a terminal during a handover procedure of the terminal to a multi-connectivity network of the construction operator, wherein the type comprises: a first type indicating that the user is a user of a sharing operator or a second type indicating that the user is a user of the construction operator;
   determining a user plane split policy corresponding to the terminal according to the type of the user of the terminal;
   switching a user plane channel of the terminal to a user plane channel of a first standard network of the construction operator, in a case that the user plane split policy corresponding to the terminal is split-disabled, and switching the user plane channel of the terminal to the user plane channel of the first standard network and a user plane channel of a second standard network of the construction operator, in a case that the user plane split policy corresponding to the terminal is split-enabled, wherein the first standard network and the second standard network are networks of different network standards; and switching a control plane of the terminal to a control plane channel of the second standard network of the construction operator.

2. The handover method according to claim 1, wherein determining the user plane split policy corresponding to the terminal according to the type of the user of the terminal comprises:

determining that the user plane split policy corresponding to the terminal is split-disabled, in a case that the type of the user of the terminal is the first type; and determining that the user plane split policy corresponding to the terminal is split-enabled, in a case that the type of the user of the terminal is the second type.

3. The data transmission method according to claim 1, wherein determining the user plane split policy corresponding to the terminal according to the type of the user of the terminal comprises:

determining the user plane split policy corresponding to the terminal, according to the type of the user of the terminal and an occupancy rate of user plane air interface resources provided by a base station in the second standard network and occupied by all terminals, of which users are of the same type as the terminal, in a case that a networking mode comprises splitting user plane data from the base station in the second standard network or splitting user plane data from a base station in the first standard network.

4. The handover method according to claim 3, wherein determining the user plane split policy corresponding to the terminal, according to the type of the user of the terminal and the occupancy rate of the user plane air interface resources provided by the base station in the second standard network and occupied by all terminals, of which users are of the same type as the terminal comprises:

determining whether the occupancy rate of the user plane air interface resources provided by the base station in the second standard network and occupied by all terminals belonging to users of the sharing operator reaches a threshold, in a case that the type of the user of the terminal is the first type, determining that the user plane split policy corresponding to the terminal is split-disabled, in a case that the occupancy rate reaches the threshold, and determining that the user plane split policy corresponding to the terminal is split-enabled, in a case that the occupancy rate does not reach the threshold; and determining that the user plane split policy corresponding to the terminal is split-enabled, in a case that the type of the user of the terminal is the second type.

5. The handover method according to claim 1, further comprising:

after determining the user plane split policy corresponding to the terminal, storing the user plane split policy corresponding to the terminal in association with identification information of the terminal.

6. The handover method according to claim 5, wherein storing the user plane split policy corresponding to the terminal in association with the identification information of the terminal comprises:

setting a split switch of a user plane channel of the second standard network corresponding to the identification information of the terminal to an off state, in a case of determining that the user plane split policy corresponding to the terminal is split-disabled; and setting the split switch of the user plane channel of the second standard network corresponding to the identification information of the terminal to an on state, in a case of determining that the user plane split policy corresponding to the terminal is split-enabled.

7. The handover method according to claim 6, wherein the split switch is set at a base station in the second standard network, in a case that a networking mode comprises splitting user plane data from the base station in the second standard network or splitting user plane data from a base station in the first standard network, and the split switch is set at a core network device, in a case that the networking mode comprises splitting user plane data from the core network of the second standard network.

8. The handover method according to claim 1, wherein determining the type of the user of the terminal comprises:

obtaining identification information of the terminal from control plane information or through an interface with a network device to which the terminal is connected before the handover procedure of the terminal, in response to receiving the control plane information of the terminal; and determining the type of the user of the terminal according to the identification information of the terminal.

9. The handover method according to claim 1, wherein determining the type of the user of the terminal during the handover procedure of the terminal to the multi-connectivity network of the construction operator comprises:

in a case that an interface is set between the network device of the construction operator and a network device to which the terminal is connected before the handover procedure of the terminal, obtaining a Public Land Mobile Network (PLMN) number of the terminal through the interface, and determining the type of the user of the terminal according to the PLMN number; or in a case that no interface is set between the network device of the construction operator and a network device to which the terminal is connected before the handover procedure of the terminal, obtaining the PLMN number of the terminal through a Radio Resource Control (RRC) connection establishment process with the terminal, and determining the type of the user of the terminal according to the PLMN number.

10. The handover method according to claim 1, wherein the first standard network is a Fifth-Generation mobile network, and the second standard network is a Fourth-Generation mobile network or a Third-Generation mobile network.

11. A network device in a multi-connectivity network, comprising:

a processor; and a memory coupled to the processor and storing instructions that when executed by the processor, cause the processor to:

determine a type of a user of a terminal during a handover procedure of the terminal to a multi-connectivity network of the construction operator, wherein the type comprising: a first type indicating that the user is a user of a sharing operator or a second type indicating that the user is a user of the construction operator;

determine a user plane split policy corresponding to the terminal according to the type of the user of the terminal;

switch a user plane channel of the terminal to a user plane channel of a first standard network of the construction operator, in a case that the user plane split policy corresponding to the terminal is split-disabled, and switch the user plane channel of the terminal to the user plane channel of the first standard network and a user plane channel of a second standard network of the construction operator, in a case that the user plane split policy corresponding to the terminal is split-enabled, wherein the first standard network and the second standard network are networks of different network standards; and switch a control plane of the terminal to a control plane channel of the second standard network of the construction operator.

12. A system in a multi-connectivity network, comprising: a network device according to claim 11; and a terminal configured to be handed over to the multi-connectivity network of the construction operator, transmit the user plane data through the user plane channel of the first standard network of the construction operator, in a case that the user plane split policy corresponding to the terminal is split-disabled, and transmit the user plane data through the user plane channel of the first standard network and the user plane channel of the second standard network of the construction operator, in a case that the user plane split policy corresponding to the terminal is split-enabled.

13. The network device according to claim 11, wherein determining the user plane split policy corresponding to the terminal according to the type of the user of the terminal comprises:

determining that the user plane split policy corresponding to the terminal is split-disabled, in a case that the type of the user of the terminal is the first type; and determining that the user plane split policy corresponding to the terminal is split-enabled, in a case that the type of the user of the terminal is the second type.

14. The network device according to claim 11, wherein determining the user plane split policy corresponding to the terminal according to the type of the user of the terminal comprises:

determining the user plane split policy corresponding to the terminal, according to the type of the user of the terminal and an occupancy rate of user plane air interface resources provided by a base station in the second standard network and occupied by all terminals, of which users are of the same type as the terminal, in a case that a networking mode comprises splitting user plane data from the base station in the second standard network or splitting user plane data from a base station in the first standard network.

15. The network device according to claim 14, wherein determining the user plane split policy corresponding to the terminal, according to the type of the user of the terminal and the occupancy rate of the user plane air interface resources provided by the base station in the second standard network and occupied by all terminals, of which users are of the same type as the terminal comprises:

determining whether the occupancy rate of the user plane air interface resources provided by the base station in the second standard network and occupied by all terminals belonging to users of the sharing operator reaches a threshold, in a case that the type of the user of the terminal is the first type, determining that the user plane split policy corresponding to the terminal is split-disabled, in a case that the occupancy rate reaches the threshold, and determining that the user plane split policy corresponding to the terminal is split-enabled, in a case that the occupancy rate does not reach the threshold; and determining that the user plane split policy corresponding to the terminal is split-enabled, in a case that the type of the user of the terminal is the second type.

16. The network device according to claim 11, wherein the memory further storing computer programs, when executed by a processor, cause the processor to store the user plane split policy corresponding to the terminal in association with identification information of the terminal to the memory.

17. The network device according to claim 16, wherein storing the user plane split policy corresponding to the terminal in association with the identification information of the terminal comprises:

setting a split switch of a user plane channel of the second standard network corresponding to the identification information of the terminal to an off state, in a case of determining that the user plane split policy corresponding to the terminal is split-disabled; and setting the split switch of the user plane channel of the second standard network corresponding to the identification information of the terminal to an on state, in a case of determining that the user plane split policy corresponding to the terminal is split-enabled.

18. The network device according to claim 11, wherein determining the type of the user of the terminal comprises:

obtaining identification information of the terminal from control plane information or through an interface with a network device to which the terminal is connected before the handover procedure of the terminal, in response to receiving the control plane information of the terminal; and determining the type of the user of the terminal according to the identification information of the terminal.

19. A non-transitory computer-readable storage medium storing computer programs, when executed by a processor, cause the processor to:

determine a type of a user of a terminal during a handover procedure of the terminal to a multi-connectivity network of the construction operator, wherein the type comprising: a first type indicating that the user is a user of a sharing operator or a second type indicating that the user is a user of the construction operator;

determine a user plane split policy corresponding to the terminal according to the type of the user of the terminal; and switch a user plane channel of the terminal to a user plane channel of a first standard network of the construction operator, in a case that the user plane split policy corresponding to the terminal is split-disabled, and switch the user plane channel of the terminal to the user plane channel of the first standard network and a user plane channel of a second standard network of the construction operator, in a case that the user plane split policy corresponding to the terminal is split-enabled, wherein the first standard network and the second standard network are networks of different network standards; and switch a control plane of the terminal to a control plane channel of the second standard network of the construction operator.

20. The non-transitory computer-readable storage medium according to claim 19, wherein determining the user plane split policy corresponding to the terminal according to the type of the user of the terminal comprises:

determining the user plane split policy corresponding to the terminal, according to the type of the user of the terminal and an occupancy rate of user plane air interface resources provided by a base station in the second standard network and occupied by all terminals, of which users are of the same type as the terminal, in a case that a networking mode comprises splitting user plane data from the base station in the second standard network or splitting user plane data from a base station in the first standard network.

* * * * *